United States Patent [19]

Clark

[11] Patent Number: 4,925,233

[45] Date of Patent: May 15, 1990

[54] ADJUSTABLE VISOR

[75] Inventor: Russell L. Clark, Zeeland, Mich.

[73] Assignee: Prince Corporation, Holland, Mich.

[21] Appl. No.: 138,368

[22] Filed: Dec. 28, 1987

[51] Int. Cl.$^5$ ............................................. B60J 3/02
[52] U.S. Cl. ............................. 296/97.11; 296/97.13
[58] Field of Search ............... 296/97 G, 97 K, 97 H, 296/97 R; 248/279

[56] References Cited

U.S. PATENT DOCUMENTS

| | | | |
|---|---|---|---|
| 2,207,668 | 7/1940 | Hudgings, Jr. | 296/97 K |
| 2,260,482 | 10/1941 | Roberts | 296/97 K |
| 2,294,317 | 8/1942 | Delcher et al. | 296/97 K |
| 2,322,898 | 6/1943 | Van Dresser | 296/97 K |
| 2,921,813 | 1/1960 | Lowry | 296/97 |
| 3,032,371 | 5/1962 | Berridge | 296/97 |
| 3,556,585 | 1/1971 | Binder | 296/97 |
| 3,865,428 | 2/1975 | Chester | 296/97 |
| 4,500,131 | 2/1985 | Fleming | 296/97 |
| 4,521,046 | 6/1985 | Foggini | 296/97 |
| 4,582,356 | 4/1986 | Kaiser et al. | 296/97 K |
| 4,681,363 | 7/1987 | Hemmeke | 296/97 |

FOREIGN PATENT DOCUMENTS 3235997 3/1984 Fed. Rep. of Germany ... 296/97 K
3324305 1/1985 Fed. Rep. of Germany ... 296/97.11

Primary Examiner—Dennis H. Pedder
Assistant Examiner—F. Hamlin Williams, Jr.
Attorney, Agent, or Firm—Price, Heneveld, Cooper, DeWitt & Litton

[57] ABSTRACT

A visor includes a visor control for coupling the visor panel to the visor pivot rod for slidable movement along the pivot rod and for snap-up storage of the visor on the pivot rod against the vehicle headliner. In the preferred embodiment, the visor control includes a torque control fixed to the visor pivot rod and a guide for slidably coupling the visor pivot rod and torque control to the visor panel. In the preferred embodiment of the invention, the guide is a pair of stationary guide blocks with guide rods extending on opposite sides of the pivot rod and through which the visor torque control slidably mounts to provide stability of the visor pivot rod and control as the visor panel moves with respect to the pivot rod.

7 Claims, 3 Drawing Sheets

4,925,233

ADJUSTABLE VISOR

BACKGROUND OF THE INVENTION

The present invention pertains to vehicle visors and particularly to a visor which is adjustable along its longitudinal axis.

There exists a variety of visors which can provide front and side window protection against the entry of sunlight A multiple visor panel installation, for example, can be employed in which simultaneous windshield and side window protection is afforded. U.S. Pat. No. 4,681,363 assigned to the present Assignee discloses one such multiple visor installation which is currently in use in commercial vehicles. Conventional single visor installations typically provide a visor which can be pivoted from the windshield position to the side window but are normally not otherwise adjustable along the visor rod There exists visor proposals in which a visor can be adjustable along a visor rod such as represented in U.S. Pat. No. 4,521,046. Such an adjustable visor, however, does not include the popular and convenient snap-up type visor pivot rod torque control such as disclosed in U.S. Pat. No. 4,500,131. Also, support of the visor on the pivot rod is difficult, particularly, when the visor is extended along the rod away from the mounting of the pivot mount to the vehicle and tends to hang from the end of the pivot rod.

SUMMARY OF THE PRESENT INVENTION

The visor system of the present system, however, provides a unique adjustable single visor installation in which a single visor panel is mounted to a visor pivot rod for movement between a front windshield and a side window position. The visor includes a pivot rod control for attaching a visor panel to the visor pivot rod such that the visor will snap-up to a storage position and also be longitudinally adjustable along the visor pivot rod.

Visors embodying the present invention include a visor panel and a visor pivot rod having one end mounted to the vehicle for movement between a windshield position and ,, side window position. Means are provided for coupling the visor panel to the pivot rod for slidable movement along the pivot rod and for snap-up storage of the visor on the pivot rod against the vehicle headliner. In the preferred embodiment, a visor control is provided and includes a torque control fixed to the visor pivot rod and slidable guide means for coupling the visor pivot rod and torque control to the panel such that the visor will snap-up in any position of the visor along its longitudinal adjustment with respect to the pivot rod. Also, in a preferred embodiment of the invention, the means for slidably mounting the visor panel to the pivot rod comprises a pair of spaced stationary guide blocks including guide rods extending on opposite sides of the pivot rod and through which the visor torque control slidably mounts to provide stability of the visor pivot rod and control as the visor panel moves with respect to the pivot rod. The guide rods are secured at either end to the guide blocks which include an aperture through which the pivot rod extends. The guide blocks also serve as travel limit stops in cooperation with the visor torque control mounted to the pivot rod.

The resultant visor construction provides a visor which can be adjustable along its longitudinal axis for selective blocking of sunlight through the windshield or side window as well as provide the desired snap-up storage of the visor against the vehicle headliner when in its forward windshield position. These and other features, objects, and advantages of the present invention will become apparent upon reading the following description thereof together with reference to the accompanying drawings in which:

DETAILED DESCRIPTION OF THE PREFERRED EMBODIMENT

Figure 1:
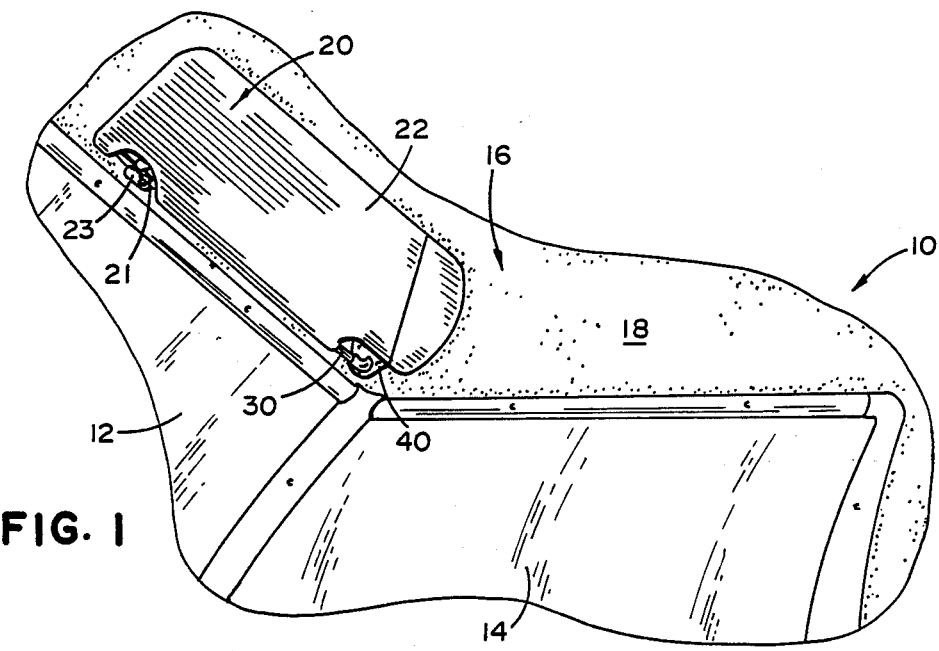
FIG. 1 is a fragmentary perspective view of a visor embodying the present invention shown in a raised, stored position against the vehicle headliner.
Figure 2:
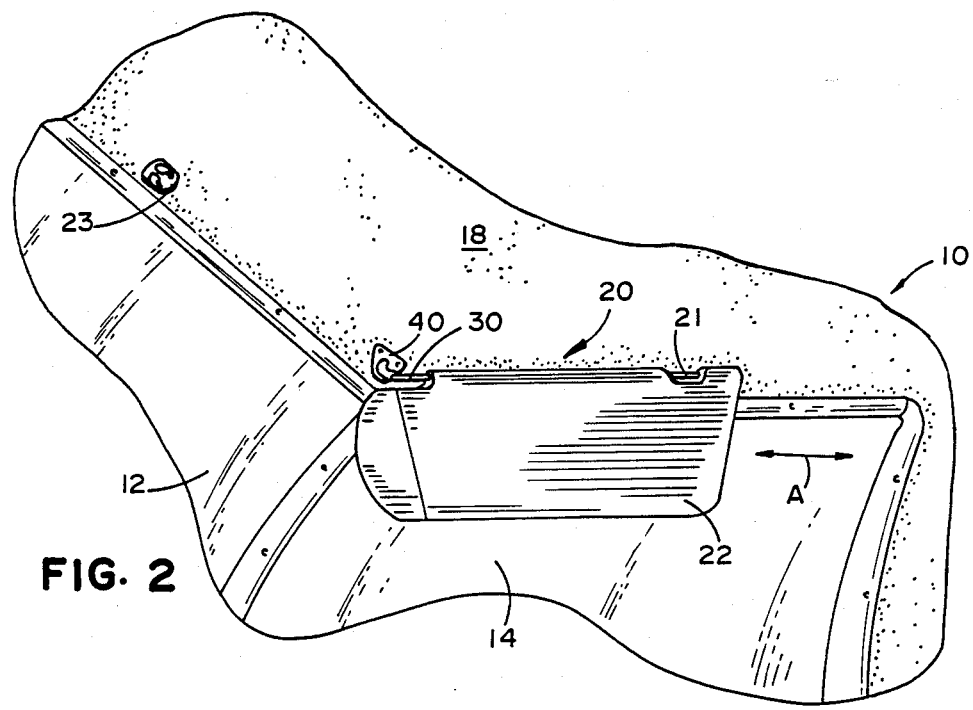
FIG. 2 is a fragmentary perspective view of the visor shown in FIG. 1 shown in a lowered, first side window use position.
Figure 3:
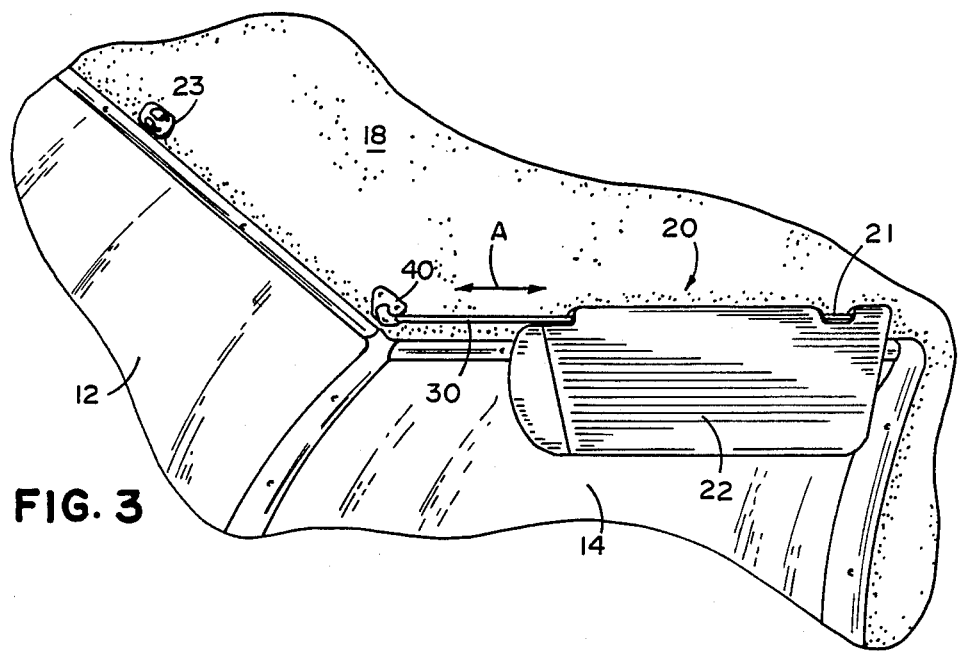
FIG. 3 is a fragmentary perspective view of the visor shown in FIG. 2 shown in a second use position adjusted with respect to the visor rod.

Referring initially to FIGS. 1–3, there is shown a vehicle 10 having a windshield 12, a passenger right side window 14, and a vehicle roof 16 typically covered with a suitable upholstery material or a preformed headliner 18. Mounted to the passenger side of the vehicle, as shown in the fragmentary perspective view of these Figures, is a visor assembly 20 which includes a visor panel 22 which includes an upholstered, folded core member as described below. The panel 22 is pivotally and slidably mounted to a pivot rod 30 which, in turn, is mounted to a conventional elbow mounting bracket 40. The elbow bracket 40 permits the visor rod 30 and visor thereon to be pivoted from the front windshield position as illustrated in FIG. 1 to the side window position as illustrated in FIGS. 2–3 in a conventional manner. The visor installation includes a secondary visor clip 21 which snap fits within a socket 23 mounted to the roof of the vehicle in spaced relationship to bracket 40 for supporting the visor in the stored position illustrated in FIG. 1. A similar visor (not shown) can be mounted to the driver's side of the vehicle.

The visor panel 22 can be moved along the visor rod 30 along its longitudinal axis as illustrated by arrow A in FIGS. 2 and 3 for providing an adjustment of the visor along the side window (or windshield once released from socket 23) for optimum sun blocking and convenience. The visor is mounted to the pivot rod 30 by a visor control means which not only permits the visor to slidably move along the visor rod but also permits the snap-up assisted storage of the visor in the position shown in FIG. 1. The construction of the visor control mechanism to accomplish this is best seen by reference to FIGS. 4–7 now described.

Figure 7:
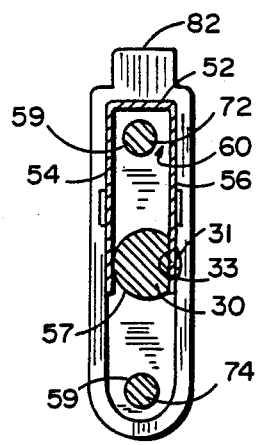
FIG. 7 is a cross-sectional view of the visor control taken along section lines VII—VII of FIG. 6.
Figure 6:
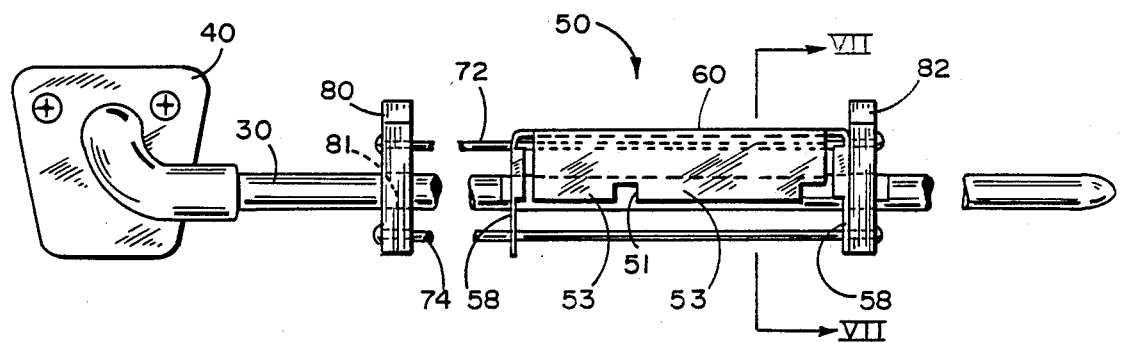
FIG. 6 is an enlarged, fragmentary view of the visor pivot rod and visor control mechanism employed in the visor of the present invention.

The visor pivot rod control 50 is shown best seen in FIG. 6 and includes, in the preferred embodiment, a torque fitting 60 the construction of which is substantially similar to that disclosed in U.S. Pat. No. 4,500,131, entitled VISOR CONTROL, issued on Feb. 19, 1985; and the disclosure of which is incorporated herein by reference. A brief description of fitting 60, however, follows. The spring steel torque fitting comprises a generally U-shaped member having a base leg 52 and downwardly depending legs 54 and 56 as best seen in FIG. 7. Each of the legs 52 and 54 include alternately staggered slots 51 and lands 53 respectively, which engage lobes and flats 31 and 33 respectively, on the pivot rod for urging the visor to a storage position in which the lands 53 of the compression spring sidewalls 54 and 56 of the torque fitting engage the flats 33 on the pivot rod 30 for holding the visor in a raised storage position as described in greater detail in the above identified patent. In other rotational positions, the lands 53 engage lobes 31 for providing a predetermined rotational and holding torque, permitting the visor to be lowered to a selected adjusted position.

The torque fitting 60 also includes downwardly depending end walls 58 on opposite ends which include a central aperture 57 for receiving pivot rod 30 and a pair of smaller vertically spaced apertures 59 for slidably receiving guide rods 72 and 74 therethrough. Apertures 59 are slightly larger in diameter than the guide rods 72 and 74 such that the torque fitting, which is axially secured to the pivot rod 30, and pivot rod 30 move along guide rods 72 and 74 to be guidably supported in part by the interengagement of the guide rods with end walls 58 of torque fitting 60.

A pair of guide blocks 80 and 82 are secured adjacent opposite ends of channel 90 (FIGS. 4 and 5) of the visor, and the ends of rods 72 and 74 are anchored by means of a suitable force fit or a bonding adhesive to blocks 80 and 82. The guide blocks 80 and 82 are preferably made of a lubricous, polymeric material such as nylon or the like and include a central aperture 81 for slidably receiving and supporting pivot rod 30 therethrough. The guide blocks 80 and 82 are rigidly attached to a channel 90 formed in at least one of the visor core halves 92 as seen in FIGS. 4 and 5 and can be secured in channel 90 by a suitable bonding adhesive for securing the ends of guide blocks 80 and 82 to reinforcing ribs 94 and 96 defining the channel.

Figure 4:
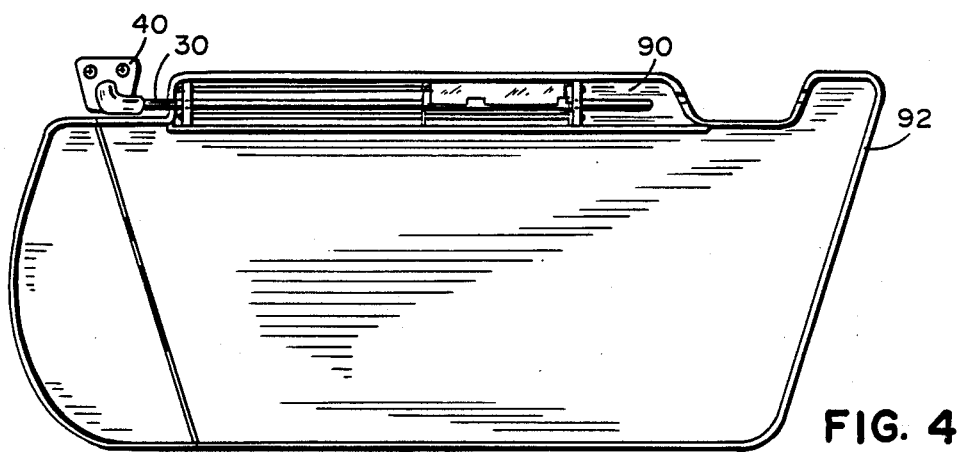
FIG. 4 is a front elevational view of the visor shown in FIG. 3 shown with one half of its core removed illustrating the position of the visor control when the visor is in the position shown in FIG. 2.
Figure 5:
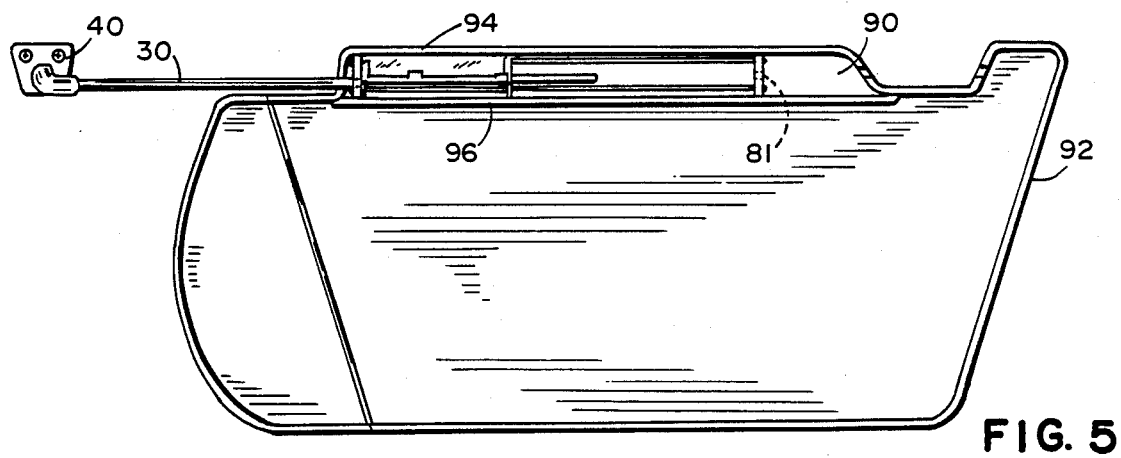
FIG. 5 is a front elevational view of the visor control with the visor moved to an adjusted position shown also in FIG. 3.

The visor panel includes a pair of core halves, including core half 92 in FIGS. 4 and 5, which are integrally molded of a suitable polymeric material such as polypropylene and joined by an integral hinge portion (not shown) extending along rib 94 at the junction of the two core halves. The construction of the core halves to snap together is more fully disclosed in U.S. patent application Ser. No. 058,996, entitled VISOR, filed on June 8, 1987, incorporated herein by reference. The visor core which mates with core half 92 will include a channel corresponding to channel 90 for providing clearance for the torque fitting 60 and guide blocks 80 and 82 when the visor core halves are folded together to complete the visor assembly. The core halves are upholstered when assembled to conform to the vehicle's interior appearance.

Thus, the visor control 50 provides means by which the visor panel, including core halves 92 and its mating core half can slide along pivot rod 30 as illustrated in FIGS. 4 and 5 with the torque fitting 60 and pivot rod 30 moving within channel 90 as illustrated in these figures. The visor is supported on pivot rod 90 by the interengagement of the pivot rod with guide blocks 80 and 82 and the torque fitting 60 attached to pivot rod 30 and its interengagement with guide rods 72 and 74. When in the fully retracted position as shown in FIG. 4, the pivot rod 90 extends through an aperture 81 in each of the guide blocks 80 and 82. When it is fully extended, as illustrated in FIG. 5, the visor motion is limited by engagement of torque fitting 60 with block 80 and guide rods 72 and 74 provide additional support for the visor by their interconnection with torque fitting 60. Thus, the torque fitting and visor pivot rod 30 slide within channel 90 between guide blocks 80 and 82 to provide the sliding movement of the visor along the pivot rod 30. The diameter of the apertures 81 in blocks 80 and 82 provide the desired frictional drag for allowing relatively easy sliding motion and yet, they allow the visor to remain in a longitudinally adjusted position. The visor torque fitting 60 operates, regardless of its position with respect to channel 90, for urging the visor to a snap-up position or for holding the visor in an adjusted, lowered position whereby the compressive force between legs 54 and 56 on the visor rod 30 holds the visor in position.

It will become apparent to those skilled in the art that various modifications to the preferred embodiment of the invention described herein can be made without departing from the spirit or scope thereof as defined by the appended claims.

The embodiments of the invention in which an exclusive property or privilege is claimed are defined as follows:

1. A vehicle visor comprising:
a visor panel including channel means formed therein adjacent one edge of said visor;
a visor pivot rod and means for mounting said pivot rod to a vehicle for movement of the visor attached to said pivot rod between a forward windshield position to a side window position;
a pivot rod control mounted to said pivot rod in a fixed longitudinal position with respect to said pivot rod but rotatable about said pivot rod, said control positioned within said channel means for coupling said pivot rod to said visor panel to permit said visor panel to slide longitudinally along the axis of said pivot rod and move with respect to said control and for urging and holding the visor in a raised, stored position against the vehicle roof; said pivot rod control comprises a torque fitting coupled to said visor pivot rod and cooperating therewith to provide an adjustable rotational torque for said visor panel with respect to said pivot rod and for urging said visor to a raised, stored position; said pivot rod control including guide elements; and separate guide means separate and apart from said channel means, located in said channel means, extending along the axis of said pivot rod, and cooperating with said guide elements for supporting and guiding said torque fitting as said visor panel is slid longitudinally along the axis of said pivot rod.

2. A vehicle visor comprising:
a visor panel including channel means formed therein adjacent one edge of said visor;
a visor pivot rod and means for mounting said pivot rod to a vehicle for movement of the visor attached to said pivot rod between a forward windshield position to a side window position; and a pivot rod control positioned within said channel means for coupling said pivot rod to said visor panel to permit said visor panel to slide longitudinally along the axis of said pivot rod and for urging and holding the visor in a raised, stored position against the vehicle roof wherein said pivot rod control comprises a torque fitting coupled to said visor pivot rod and cooperating therewith to provide an adjustable rotational torque for said visor panel with respect to said pivot rod and for urging said visor to a raised, stored position; wherein said pivot rod control further comprises means for slidably mounting said torque fitting to said visor panel within said channel means; and wherein said means for slidably mounting said torque fitting comprises a pair of spaced guide rods extending between and mounted to a pair of spaced guide blocks positioned in said channel near opposite ends thereof and wherein said torque fitting includes aperture means for slidably mounting said torque fitting to said guide rods.

3. The apparatus as defined in claim 2 wherein said pivot rod extends centrally through said torque fitting and wherein said guide rods extend on opposite sides of said pivot rod.

4. The apparatus as defined in claim 3 wherein said guide blocks are made of a lubricous polymeric material and include a central aperture for slidably receiving said pivot rod therethrough.

5. A visor control comprising:
a visor pivot rod for mounting a visor to a vehicle for movement of the visor attached to said pivot rod between a forward windshield position and a side window position;
a torque fitting coupled to said visor pivot rod and cooperating therewith to provide a rotational torque between said torque fitting and said pivot rod and for urging a visor attached to said pivot rod to a raised, stored position; and
slide means for slidably receiving and supporting said torque fitting and pivot rod, said slide means adapted to mount within a visor panel to allow the visor to move along the axis of said pivot rod, wherein said slide means comprises a pair of spaced guide rods extending between and mounted to a pair of spaced guide blocks and wherein said torque fitting included aperture means for slidably mounting said torque fitting to said guide rods.

6. The apparatus as defined in claim 5 wherein said pivot rod extends centrally through said torque fitting and wherein said guide rods extend on opposite sides of said pivot rod.

7. The apparatus as defined in claim 6 wherein said guide blocks are made of a lubricous polymeric material and include a central aperture for slidably receiving said pivot rod therethrough.

* * * * *